(12) United States Patent
Stauber et al.

(10) Patent No.: US 11,461,731 B1
(45) Date of Patent: Oct. 4, 2022

(54) SUPPLY CHAIN MANAGEMENT, TRACKING, AND INTEGRATION PLATFORM

(71) Applicant: FourKites, Inc., Chicago, IL (US)

(72) Inventors: Chris Stauber, Danville, CA (US); Adam G. Pasztory, San Francisco, CA (US); Sajid Ali Mudassar, Punjab (PK); Muhammad Waqas Khan, Lahore (PK); Jeffrey Wehner, Singapore (SG)

(73) Assignee: FourKites, Inc., Chicago, IL (US)

( * ) Notice: Subject to any disclaimer, the term of this patent is extended or adjusted under 35 U.S.C. 154(b) by 0 days.

(21) Appl. No.: 17/490,871

(22) Filed: Sep. 30, 2021

Related U.S. Application Data

(60) Provisional application No. 63/238,540, filed on Aug. 30, 2021.

(51) Int. Cl.
  *G06Q 10/08* (2012.01)
  *G06V 30/414* (2022.01)
  *G06V 30/418* (2022.01)

(52) U.S. Cl.
  CPC ....... *G06Q 10/0833* (2013.01); *G06V 30/414* (2022.01); *G06V 30/418* (2022.01)

(58) Field of Classification Search
  CPC .................. G06V 30/414; G06V 30/418
  See application file for complete search history.

(56) References Cited

U.S. PATENT DOCUMENTS

| | | | |
|---|---|---|---|
| 9,286,283 B1* | 3/2016 | Wilczek | G06V 30/412 |
| 9,847,973 B1* | 12/2017 | Jakobsson | H04L 63/1441 |
| 2014/0337245 A1* | 11/2014 | Bhatt | G06Q 10/0833 |
| | | | 705/333 |
| 2015/0235301 A1* | 8/2015 | Brady | G06Q 30/0635 |
| | | | 705/26.81 |
| 2017/0147978 A1* | 5/2017 | Mccormick | H04N 1/444 |
| 2021/0081664 A1* | 3/2021 | Weller | G06V 30/40 |

* cited by examiner

*Primary Examiner* — Christle I Marshall
(74) *Attorney, Agent, or Firm* — Polsinelli PC

(57) ABSTRACT

Systems, methods, and non-transitory media are provided for supply chain management, tracking, and integration. An example method can include receiving, via one or more processors, a document associated with a booking of a shipment; extracting, via the one or more processors, data in the document associated with the booking of the shipment; based on the extracted data, generating a shipment record in a shipment management system; and based on the shipment record, tracking the shipment associated with the booking.

20 Claims, 7 Drawing Sheets

SUPPLY CHAIN MANAGEMENT, TRACKING, AND INTEGRATION PLATFORM

PRIORITY

This application claims the benefit of, and priority to, U.S. Provisional Patent Application No. 63/238,540, filed Aug. 30, 2021, the contents of which are hereby expressly incorporated by reference in their entirety and for all purposes.

TECHNICAL FIELD

The present disclosure generally relates to systems and techniques for supply chain management, tracking, and integration.

BACKGROUND

Shippers who import from various suppliers often use pre-defined commercial terms or International Commercial Terms (Incoterms) that instruct the suppliers to make the carriage bookings. Unfortunately, in many cases, when a carriage booking is made, the shipper may not have visibility into the shipment or may have partial or incomplete visibility into the shipment. For example, in many cases, the supplier may not provide the booking data to the shipper after making a carriage booking. Without the booking data, the shipper may lack at least some visibility into the shipment. Such incomplete or lack of visibility into the shipment can cause gaps or inaccuracies in the supply chain visibility and/or limit or complicate the shipper's ability to track and/or process certain aspects of the shipment and provide customers accurate and/or detailed tracking and visibility of the shipment. Moreover, these factors are generally not under the control of the shipper and, as previously explained, can negatively affect the shipper's ability to accurately and/or consistently track shipments and/or provide visibility information.

BRIEF DESCRIPTION OF THE DRAWINGS

In order to describe the manner in which the various advantages and features of the disclosure can be obtained, a more particular description of the principles described herein will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
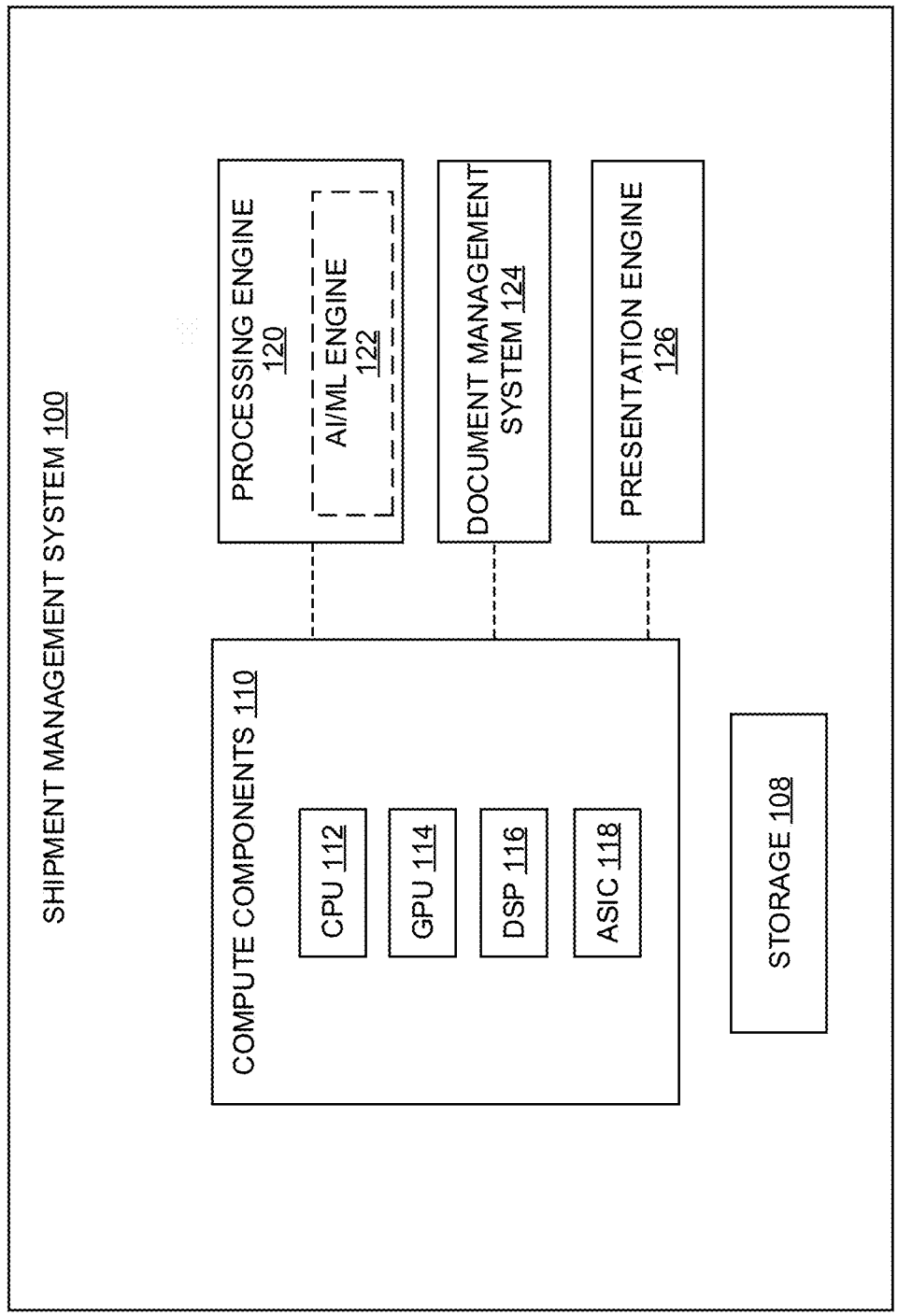
FIG. 1 is a block diagram illustrating an example shipment management system for automatically generating shipments, tracking shipments and associated data, and providing supply chain visibility and management for shipping freights/loads, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, shippers who import from various suppliers often use pre-defined commercial terms or International Commercial Terms (Incoterms) that instruct the suppliers to make carriage bookings. Unfortunately, in many cases, when a carriage booking is made, the shipper may not have visibility into the shipment or may have partial or incomplete visibility into the shipment. For example, in many cases, the supplier may not provide the booking data to the shipper after making a carriage booking. Moreover, generally, the process of generating a shipment record (also referred to as a shipment or order herein) in the shipper's system is mostly or entirely manual, which is not only expensive and burdensome but can also delay the shipment and/or delay, prevent, or limit certain shipment-related data and features, such as shipment tracking/visibility, shipment data processing, shipment operations, certain workflows, etc.

To illustrate, without a shipment record or even booking data, the shipper may lack at least some visibility into the shipment and may not be able to track the shipment (or certain aspects of the shipment) end-to-end. In some cases, such incomplete or lack of visibility into the shipment can cause gaps or inaccuracies in the supply chain visibility and/or flow/operations, can limit or complicate the shipper's ability to track and/or process certain aspects of the shipment and provide customers accurate and/or detailed tracking and visibility of the shipment, etc. Moreover, these factors are generally not under the control of the shipper and, as previously explained, can negatively affect the shipper's ability to accurately and/or consistently track or process shipments and/or provide shipment visibility information.

Disclosed herein are systems, methods, techniques, and computer-readable storage media (collectively "systems and techniques" hereinafter) for supply chain management, tracking, and integration. In some examples, the systems and techniques disclosed herein can provide an integrated platform and automated process for generating shipment records, providing shipment tracking, visibility, and other features/functionalities, increasing the cost and/or efficiency of shipment operations and shipment data processing, provide an improved and more intelligent and efficient computer-based system/platform, etc. In some examples, the systems and techniques described herein can provide an integrated platform and automated process for extracting and validating data from a document or data object associated with a carriage booking (e.g., an invoice, a purchase order, a booking confirmation, shipment instructions, a shipping notice, an input form, etc.), using the extracted data to generate a shipment (e.g., a shipment record and/or order), and providing tracking and visibility of the shipment and associated data and/or state.

In some cases, the systems and techniques disclosed herein can extract booking and/or shipment data from a document associated with a carriage booking and create and track shipments based on the extracted booking data. In some examples, an integrated platform associated with a shipper can capture a document (e.g., an invoice, a purchase order, shipment instructions, a shipping notice, a booking, etc.) generated by a party such as a supplier (e.g., a document sent to or uploaded into the integrated platform by the supplier), and use data extracted/recognized from the document to create a shipment (e.g., a shipment record and/or order) associated with the carriage booking. The shipment can be created in the integrated platform and can include data about the booking and associated shipment, which can be used to track the shipment and/or information about the shipment and provide visibility into one or more stages/states of the shipment.

Thus, as previously explained, the data in the document (e.g., invoice, etc.) associated with the booking can be used to automatically create the shipment and enable tracking and provide visibility of shipment information. The supplier generally has an incentive to bill the buyer as soon as possible. Therefore, in some examples, the invoice information from a supplier can provide reliable and timely information about the shipment and/or booking. For example, the invoice information can provide information about the shipment early in the process (e.g., pre-shipment), which can be used to create a shipment record/order early in the process and enable early tracking/visibility (and/or end-to-end tracking/visibility) and can support various workflows and downstream processes that may not otherwise be possible (or may be limited) with a manual process or any less efficient process.

In some examples, when the document (e.g., the invoice, etc.) is generated, the document can be automatically sent to a destination (e.g., an address, an endpoint, etc.) associated with the integrated platform, such as an application or system of the integrated platform. At the destination, the integrated platform (e.g., an associated application/service and/or system) can extract the document from the electronic message/transmission sent to the destination, and implement an extraction/recognition process (e.g., via optical character recognition (OCR), an image processing algorithm, a machine learning extraction/recognition algorithm, and/or the like) to recognize and extract salient data elements from the document. The integrated platform can use the extracted data from the document to automatically create a shipment in the system for that document, which can be used to record/track the shipment and/or information about the shipment. In some cases, the integrated platform can save the document in the system and/or attach the document to the shipment created in the system. In some examples, the integrated platform can automatically create the shipment early in the process, which can increase the tracking/visibility available for the shipment and enable various features/functionalities such as downstream processes, increase shipment and/or shipment management efficiency and/or flexibility, enhance workflows, increase workflow options, etc.

The shipment data created in the integrated platform can provide visibility of the shipment before and/or after departure. Non-limiting examples of the visibility provided by the shipment created based on the data in the invoice can include the rates available for the shipment, vessel and/or transit times and/or options, the estimated time of departure of a vessel used for the shipment, whether the carrier is typically on time for a trade lane associated with the shipment, whether the necessary shipment documents are completed prior to departure and/or when needed, whether the documents necessary to clear customs are completed, a state/status of the shipment, a trajectory of the shipment, a history of the shipment, door-to-door and/or port-to-door tracking information, port information, carrier information, carrier updates, terrestrial and/or satellite tracking data, a predicted estimated time of arrival, shipment updates, actual and/or predicted shipment progress, shipment statistics, a shipment route(s), shipment alerts/notifications, shipment events, shipment estimates, etc.

In some examples, an automated process for creating and tracking shipments based on data from an input document (e.g., an invoice, a purchase order, a form, shipment instructions, shipment notice, etc.) can be used to accurately and efficiently create and track high volumes of shipments from parties (e.g., suppliers, distributors, etc.) at different geographic locations and/or distributed across geographic locations. For example, the automated process can create a large number of shipments that cannot be practically performed manually by a human and can significantly reduce any delays in otherwise trying to create any of such shipments manually or through a less efficient process. The reduction in delays can increase the accuracy of the data and enable various/additional and/or enhanced features (e.g., tracking, visibility, predictions, calculations, workflows, options, operations, etc.) at earlier stages in the process and/or any other stage in the process. In some examples, the reduction in delays in creating shipments and/or the ability to provide early tracking information can enable various features that would not be possible or would be limited if the processing or availability of such data is delayed or prohibited by a manual process or another less efficient process. The automated process can reduce the complexity and/or cost of creating shipments and associated data using other mechanisms for communicating relevant data such as, for example, electronic data interchange (EDI), application programming interfaces (APIs), etc.

In some examples of an automated process, the integrated platform can obtain an invoice for an item from a supplier of the item. The supplier can enter the invoice into their system and print the invoice in a particular format, such as a portable document format (PDF) or an image format. The supplier can send the printed invoice to a destination associated with the integrated platform, such as a destination Internet Protocol (IP) address or a destination email address. An application and/or system at the destination (e.g., an application/service, a node, an algorithm, and/or a component of the integrated platform) can recognize the received communication with the invoice and extract the invoice from the received communication. The application and/or system can implement an extraction/recognition algorithm, such as an optical character recognition (OCR) algorithm, an image processing algorithm, an artificial intelligence or machine learning algorithm, and/or a neural network (e.g., a convolutional neural network (CNN), a neural network classifier, etc.) configured to perform optical character recognition, to recognize and extract data from the extracted invoice. The integrated platform can store the extracted data in a structured manner, and use the data to create or update a shipment.

In some examples, the integrated platform can implement complex logic to determine if the invoice being processed is already in the system and associated with a shipment. In some cases, part of the complexity can result from the existence or creation of multiple documents (e.g., invoices, bookings, purchase orders, etc.) for a particular shipment. In some examples, multiple versions of an invoice may be obtained by the integrated platform and analyzed to identify/recognize newer versions of the invoice, more accurate and/or corrected data, etc., which the integrated platform can use to create or update the shipment.

In some cases, the integrated platform can include a robust document management system that helps users determine the documents needed for a shipment, and provide secure access and storage for such documents. When users upload documents to a shipment, the integrated platform can scan the uploaded documents and process them with a recognition process such as OCR. The data extracted from the documents can be stored in a structured way on the integrated platform.

Document accuracy can be important/beneficial for transportation, including international cargo transportation. For example, when there are discrepancies or missing data, a cargo can be delayed in customs or blocked from being loaded on a vessel. When financing is involved, errors in the documents can prevent the transfer of goods and/or the release of payments. For example, the bill of landing (BOL), the packing list, and the invoice should generally match to avoid such issues. The integrated platform can provide document matching reports to ensure a match between the data in documents (e.g., BOL, packing list, invoice, etc.) that should match as noted above. In some examples, the integrated platform can use matching algorithms that implement artificial intelligence (AI) or machine learning (ML) to detect when there is not an exact match between certain documents but the meaning of the data in the documents is sufficiently exact to avoid triggering one or more issues/errors that result from document mismatches. For example, an AI or ML algorithm can detect a mismatch between a payment specified in one document (e.g., $1400) and the payment specified in another document (e.g., $1400.00) associated with a same booking/shipment, and determine that, while the payment in the documents is not an exact match (e.g., $1400 versus $1400.00), the mismatch is merely in formatting and/or does not affect the meaning of the mismatched payment data in the documents. In some examples, the system can ignore or correct such non-meaningful or error-triggering mismatches.

FIG. 1 illustrates an example shipment management system 100 for automatically generating shipments (e.g., shipment records, shipment orders, shipment data, etc.), tracking shipments and associated data, and providing supply chain visibility and management for freights/loads. As further described herein, the shipment management system 100 can include, implement, and/or represent an integrated shipping and/or supply chain visibility and management platform and can provide various advantages such as automated data management, timely and robust shipment tracking and visibility, workflow management, enhanced and/or additional workflows, efficient and timely data and document management, greater consistency and reliability of shipment and tracking information, lower data and shipment management costs, reduced shipping complexities, etc.

In the example shown in FIG. 1, the shipment management system 100 includes a storage 108, compute components 110, a processing engine 120, an AI/ML engine 122, a document management system 124, and a presentation engine 126. However, it should be noted that the example components shown in FIG. 1 are provided for illustration purposes and, in other examples, the shipment management system 100 can include more or less components (and/or different components) than those shown in FIG. 1.

The shipment management system 100 can be part of a computing device or multiple computing devices. In some examples, the shipment management system 100 can be part of an electronic device (or devices) such as a server, a content management system, a host machine in a network such as a cloud or private network, a computer in a vehicle, a computer node, or any other suitable electronic device(s). In some examples, the shipment management system 100 can be or can include one or more software services and/or virtual instances hosted on a datacenter or a network environment. For example, the shipment management system 100 ca be implemented by, or as part of, one or more software containers hosted on a datacenter or network (e.g., a cloud, a private network, etc.), one or more virtual machines hosted on a datacenter or network, one or more functions (e.g., function-as-a-service, virtualized function, serverless computing function, etc.) hosted on one or more execution environments or hosts on a datacenter or network, a distributed physical and/or virtualized infrastructure, etc.

In some cases, the shipment management system 100 can be implemented in a distributed fashion across one or more networks and/or devices. For example, the shipment management system 100 can be a distributed system implemented by, or hosted on, one or more hosts and/or infrastructure nodes/components/systems on one or more clouds, datacenters, networks, and/or compute environments.

In some implementations, the storage 108, the compute components 110, the processing engine 120, the AI/ML engine 122, the document management system 124, and/or the presentation engine 126 can be part of the same computing device. For example, in some cases, the storage 108, the compute components 110, the processing engine 120, the AI/ML engine 122, the document management system 124, and/or the presentation engine 126 can be implemented by a server computer. In other implementations, the storage 108, the compute components 110, the processing engine 120, the AI/ML engine 122, the document management system 124, and/or the presentation engine 126 can be part of two or more separate computing devices.

The storage 108 can be any storage device(s) for storing data, such as shipment data, invoices, tracking and/or visibility information (e.g., shipment routes, shipment states, driving/transportation information (e.g., tracking, estimates, options, rates, updates, etc.), historical information, reports, shipment statistics, information collected from one or more sources, statistics, documents/files, data objects, profiles, carrier information, shipper information, industry information, load or freight information, requirements or constraints, preferences, analytics, collaboration data (e.g., messages, comments, documents, etc.), reports, and/or any other data. Moreover, the storage 108 can store data from any of the components of the shipment management system 100. For example, the storage 108 can store data (e.g., shipment data, invoices, processing parameters, predictive outputs, processing results, generated estimates, algorithms, tracking data, analytics, messages, reports, etc.) from the compute components 110, the processing engine 120, and/or the AI/ML engine 122, data or content from the document management system 124 (e.g., documents, data objects, etc.), and/or data or content from the presentation engine 126 (e.g., renderings, display outputs, interface content, web page content, message content, etc.).

In some implementations, the compute components 110 can include a central processing unit (CPU) 112, a graphics processing unit (GPU) 114, a digital signal processor (DSP) 116, an application-specific integrated controller (ASIC) 118, and/or one or more other processing devices or controllers. It should be noted that the compute components 110 shown in FIG. 1 are provided for illustration purposes and, in other examples, the shipment management system 100 can include more or less (and/or different) compute components than those shown in FIG. 1.

The compute components 110 can perform various operations such machine learning and/or AI operations, optical character recognition, data extraction, data validation, document management, shipment generation (e.g., generation of shipment records, orders, and/or associated data), predictive estimates or calculations, graphics rendering, content delivery, data processing, object or feature recognition, image processing, data mining, tracking, filtering, mapping operations, messaging operations, content generation, shipment analytics, workflow management, and/or any of the various operations described herein. In some examples, the compute components 110 can implement the processing engine 120, the AI/ML engine 122, the document management system 124, and/or the presentation engine 126. In other examples, the compute components 110 can additionally or alternatively implement one or more other processing engines and/or software services.

The operations performed by the processing engine 120, the AI/ML engine 122, the document management system 124, and/or the presentation engine 126 can be implemented by one or more of the compute components 110. In one illustrative example, the processing engine 120, the one or more AI/ML engine 122, and/or the document management system 124 (and associated operations) can be implemented by the CPU 112, the DSP 116, and/or the ASIC 118, and the presentation engine 126 (and associated operations) can be implemented by the CPU 112 and/or the GPU 114. In some cases, the compute components 110 can include other electronic circuits or hardware, computer software, firmware, or any combination thereof, to perform any of the various operations described herein.

In some cases, the compute components 110 can generate and/or provide a user interface (UI) or content item for presenting/displaying/rendering data such as shipment data, tracking and/or visibility information (e.g., real-time and/or predicted tracking and/or visibility information) associated with shipments and/or freights/loads, shipment analytics/insights, booking data, documents, statistics, messages, previews, visualizations, maps, navigation data, routes, etc. In some examples, tracking and/or visibility information can include, for example and without limitation, real-time and/or estimated/predicted shipment states/status and/or statistics, real-time and/or estimated/predicted routes and/or ports, shipment analytics/insights, schedule data, terminal data, shipment conditions, shipment parameters, shipment updates, tracking visualizations, notifications, etc. In some examples, the UI can present real-time visibility information obtained at one or more periods/stages during the journey. In some examples, the compute components 110 can provide such UI and/or information via the presentation engine 126.

In some examples, the compute components 110 can extract data from invoices and automatically generate shipments based on the invoice data and tracking/visibility information associated with the shipments. For example, in some cases, the processing engine 120 and/or the AI/ML engine 122 implemented by the compute components 110 can extract data from invoices and automatically generate shipments based on the invoice data and tracking/visibility information associated with the shipments.

In some examples, the processing engine 120 implemented by the compute components 110 can predict, in prior, the route a freight or load is going to travel from a pickup location to a delivery destination and/or the location of the freight or load at one or more times, based information obtained or collected by the processing engine 120, such as any shipment data, load information including one or more attributes of the load and/or trip, carrier data, supplier data, routing data, port data, etc. The attributes of the load and/or trip may include, for example, the carrier transporting the load, the industry to which the item being carried can be categorized to, the shipper of the load, the day/time at which the load is being carried, delivery preferences and/or constraints, load characteristics and/or requirements, the distance between the pickup location and the delivery destination, the geographic region(s) associated with the trip, seasonality characteristics (e.g., a season associated with the trip), port information, etc.

In some examples, the processing engine 120 may analyze a history of previous loads from the particular shipper to identify additional information, such as information about the carrier often used by that shipper and/or for that type of load (e.g., certain carriers having a temperature-controlled vehicle if the load has temperature requirements, certain carriers having a vehicle that can transport a certain type of chemical included in the load, certain carriers that can transport loads as large as the load being transported, etc.). The processing engine 120 may also review a history of trips by that carrier and/or for similar loads and identify certain route patterns. Based on some or all of this information above (and/or any other relevant information), the processing engine 120 may identify a most-probable route that the carrier with the load will travel and/or a ranked list of possible routes that the carrier of the load will travel. The processing engine 120 can generate a prediction output identifying the predicted route for the load.

In some aspects, the processing engine 120 can generate tracking/visibility information associated with a shipment. In some examples, the processing engine 120 can generate tracking/visibility information based on shipment data generated based on invoice data as previously explained. In some cases, the processing engine 120 can generate the tracking/visibility information based on real-time state information (e.g., location measurements/updates, real-time events information, statistics, real-time reports, predicted/estimated location information, predicted/estimated events, analytics/insights, etc.) and/or predicted/estimated information obtained by the processing engine 120. For example, in some cases, the processing engine 120 can generate updates about the route a load/shipment is traveling (and/or is predicted to travel), actual and/or predicted transportation (e.g., driving, shipping, etc.) patterns, statistics associated with a load/shipment (e.g., stops, ports, lanes, speed, trajectory, shipment/transportation events, delays, departures, arrivals, updates, locations, timing information, rates, geographic events, shipment/transportation conditions, etc.), schedules, movements, progress data, timing estimates, etc.

Moreover, the processing engine 120 can generate such information and operate on scenarios where there is no real/actual or accurate visibility information or there is only partial real/actual or accurate visibility information. For example, the processing engine 120 can generate such information and operate in scenarios where there are only limited real-time data updates (e.g., only at limited times and/or locations during the trip) about the carrier or load available. Real/actual visibility information can be obtained from one or more sources such as, for example, one or more GPS devices, ELD devices, a shipper/carrier/third party (e.g., location updates from the shipper, carrier, or a third party), the Internet, electronic devices (e.g., smartphones, tracking devices, laptops, tablet computers, servers, etc.), device pings, data web scrapping, API endpoints, news reports, users, computers on vehicles, smart devices, and/or any other sources.

In some examples, the processing engine 120 can implement the AI/ML engine 122 to extract data from printed invoices and/or invoice documents to generate a shipment and/or tracking/visibility information. In some cases, the processing engine 120 can implement the AI/ML engine 122 to predict/estimate shipment information such as, for example, the route a shipment is going to travel from a pickup location to a delivery destination, estimated time of arrivals, estimated time of departures from locations (e.g., stops, ports, intermediate destinations, etc.) along a route/path of a shipment, estimated delays, estimated rates, estimated transit times, estimated transit conditions, estimated shipment changes, estimated shipment performance, etc. In some cases, the AI/ML engine 122 can implement one or more neural networks, such as a convolutional neural network (CNN), a recurrent neural network, a classifier, etc., to generate predictions/estimates and/or extract data from invoice documents and/or images. In other cases, the AI/ML engine 122 can implement other techniques, algorithms, etc., to generate predictions/estimates such as, for example, sequence modelling, learning, prediction (e.g., using AI), Markov chains, tensor factorization, dynamic Bayesian networks, conditional random fields, etc.

The document management system 124 can manage documents and data associated with shipments, invoices, terms, requirements, carriers, suppliers, goods/loads, shippers, workflows, templates, documentations, purchase orders, instructions, customs documents, shipment documents, schedules, etc. In some examples, the document management system 124 can support one or more collaboration features such as, for example, messaging, document sharing, templates, commenting, interactions, versioning/synchronization, etc. In some cases, the document management system 124 can help shippers manage complex and/or copious documentation requirements of international (and other) shipping, and collaborate with parties involved in a booking/shipment. In some examples, the document management system 124 can provide real-time messaging tools organized around shipments and/or workflows (in addition to or in lieu of emails, manual processes, etc.), automated templates, triggers of tasks, permissions, documentation (e.g., invoices, purchase orders, bills of landing, courier instructions, packing lists, etc.), etc.

The presentation engine 126 can generate/render information for presentation on a display device. For example, the presentation engine 126 can display/render shipment information, tracking/visibility information, documents, statistics, maps and/or mapping information, navigation information, statistics, previews, visualizations, animations, metrics, updates, reports, etc. In some examples, the presentation engine 126 can display actual and/or predicted routes, stops, delays, events, statistics, and/or other information associated with a shipment. In some cases, the presentation engine 126 can display a map with actual and/or predicted/preview routes, stops, delays, events, statistics, etc. In some cases, the processing engine 120 and/or the AI/ML engine 122 can generate route previews and/or visibility information in maps based on data and calculations generated by the processing engine 120 and/or the AI/ML engine 122. The presentation engine 126 can generate a user interface displaying such information. In some cases, the document management system 124 can maintain and/or manage mapping data such as routes, directions, landmarks, locations, geographic information, addresses, distance information, three-dimensional renderings, route previews, landscapes, road/street names, shipping lanes, ports, navigation data, status data, etc.

In some examples, the shipment management system 100 can provide real-time supply chain visibility, and end-to-end management for shipments. The shipments can include transportation by land, transportation by ocean, transportation by air, local/national shipments, and/or international shipments. The shipment management system 100 can integrate advanced document management capabilities (e.g., via document management system 124), robust collaboration features and support for bookings, end-to-end real-time and/or predictive tracking, etc. The shipment management system 100 can perform an automated process as described herein, which can, among other things, expedite the flow of goods through busy routes and/or locations such as ports, significantly reduce detention and demurrage costs, improve shipment and/or supply chain visibility, improve system performance/efficiency, improve customer satisfaction, etc.

In some examples, the shipment management system 100 can provide integration (e.g., via automated processing, via application-programming interfaces, etc.) between various systems and enable data sharing between the shipment management system 100 and other shipper and/or supply chain systems such as, for example and without limitation, any transportation management system (TMS), enterprise resource planning (ERP) platform, etc.

In some examples, the shipment management system 100 can provide a variety of product capabilities such as, for example and without limitation, advanced document management and collaboration features that help shippers manage the complex and copious documentation requirements of shipping (particularly international shipping) and/or collaborate with all parties involved in a container move; real-time messaging tools organized around shipments and workflows (e.g., in addition to or in lieu of emails and/or manual processes); automated templates that can trigger tasks, set permissions, prepare documentations (e.g., shipments, purchase orders, bills of landing, courier instructions, packing lists, among others); collaboration features that enable trading partners to collaborate in a secure network-based or cloud-based digital hub that contains the necessary shipping documents (including international shipping documents); improved/enhanced tracking capabilities which can capture more data via one or more sources and/or with greater accuracy, provided additional visibility, etc.; greater visibility into bookings; end-to-end tracking that links any transportation segments/hops (e.g., ocean, rail, air, road, yard, etc.) such as ocean to rail, air, over-the-road and/or yard; provide deeper insights and analytics with reporting of on-time performance, cycle and transit times, detention and demurrage, among others; etc.

The shipment management system 100 can source data from one or more sources. For example, the shipment management system 100 can source data from integrations (e.g., via an automated process as described herein, electronic data interchange (EDI) documents such as EDI 315, APIs, etc.) with carriers; real-time automatic identification system (AIS) data through vessel transponders; schedule data across routes, lanes, carriers, services, etc.; terminal data across terminals; dray carrier integrations for multi-modal connectivity; booking data; supplier documents and/or systems; etc.

The shipment management system 100 can provide transparent shipping schedules, tracking, timely documentation, end-to-end and/or real-time visibility, etc., which can reduce or eliminate various problems and/or complexities in shipping and/or supply chain scenarios, such as the complex and vast amount of documentation requirements, rate management, bookings, etc., in shipping including international ocean shipping. The shipment management system 100 can eliminate or mitigate detention and demurrage risks, deliver a seamless experience to customers, reduce costs, etc.

While the shipment management system 100 is shown to include certain components, one of ordinary skill will appreciate that the shipment management system 100 can include more or fewer components than those shown in FIG. 1. For example, the shipment management system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the shipment management system 100 is described below with respect to FIG. 7.

Figure 2:
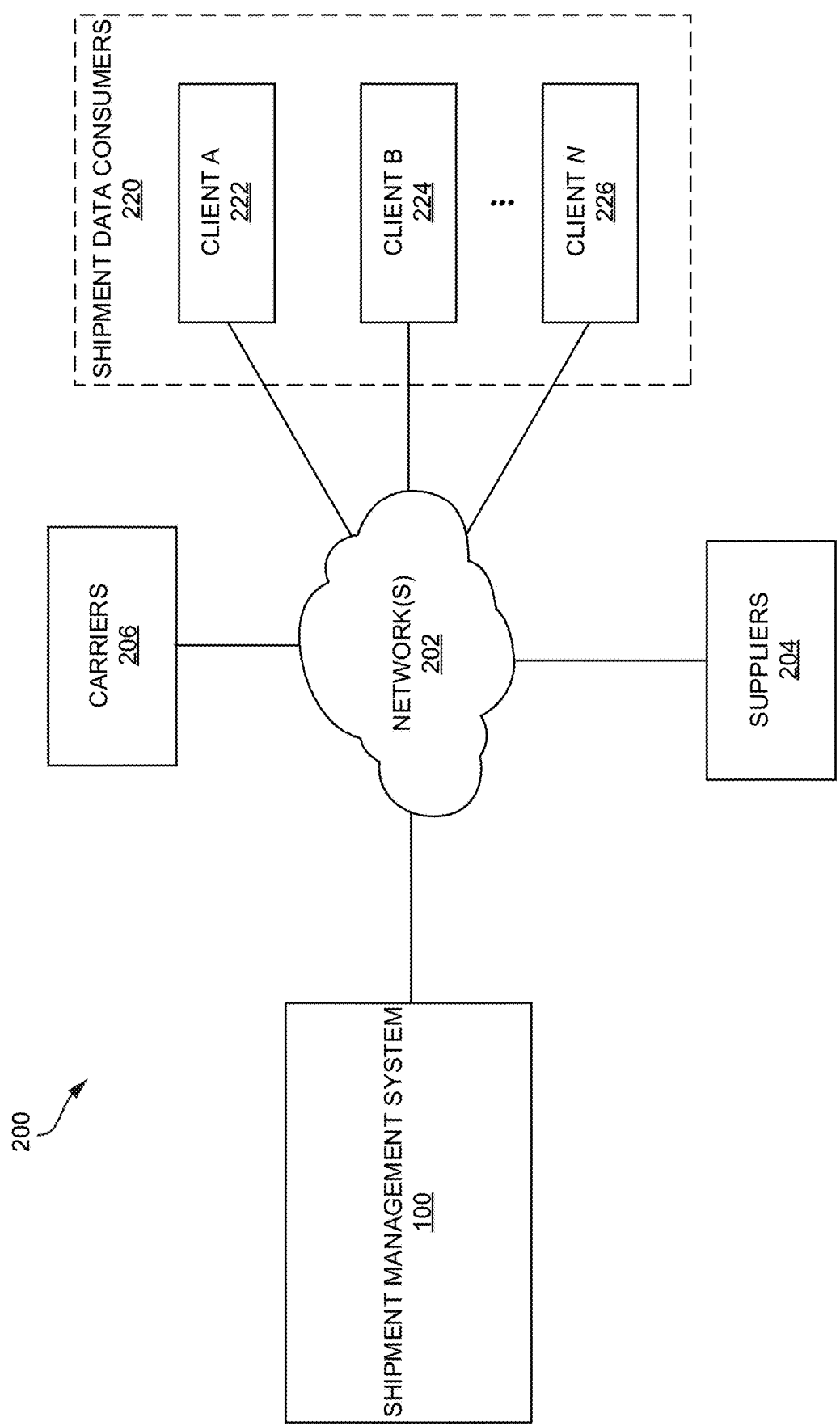
FIG. 2 illustrates an example environment for implementing an integrated shipment platform, in accordance with some examples of the present disclosure.

FIG. 2 illustrates an example environment 200 for implementing an integrated shipment platform such as shipment management system 100. In this example, the environment 200 includes the shipment management system 100. The shipment management system 100 can automate the creation of shipments and related data and/or workflows, provide tracking/visibility information to any client devices 222-226 of shipment data consumers 220. In some examples, a shipment can include a shipment record and/or order in the shipment management system 100. In some cases, an item associated with a shipment can be shipped via land (e.g., road, rail, yard, etc.), air, water, etc. In some examples, an item associated with a shipment can be shipped within geographic boundaries (e.g., locally, nationally, etc.) and/or across geographic boundaries (e.g., internationally, etc.).

The shipment management system 100 can communicate with suppliers 204, carriers 206, and the client devices 222-226 over a network 202. The network 202 can include one or more private and/or public networks, such as one or more local area networks (LANs), wide area networks (WANs), cloud networks (private and/or public), on-premises datacenters, cellular networks, virtual private networks (VPNs), and/or any other type(s) of network(s).

The client devices 222-226 can include any electronic devices used by shipment data consumers 220, such as users and/or customers of an entity (e.g., a shipper, a management party, etc.) associated with the shipment management system 100, to communicate with the shipment management system 100 and obtain associated data and services, as further described herein. For example, the client devices 222-226 can include a laptop computer, a tablet computer, a smartphone, a desktop computer, a server, an internet-of-thing (IoT) device, a smart or autonomous vehicle (e.g., a computer on an autonomous vehicle), a mobile device, etc. In some examples, the client devices 222-226 can access information and services provided by the shipment management system 100, such as shipment data and/or tracking/visibility information (e.g., real-time and/or predicted), via the network 202. In some cases, the client devices 222-226 and/or the shipment data consumers 220 can also provide information to the shipment management system 100. For example, the client devices 222-226 can provide shipment data, documents, inputs, and/or updates to the shipment management system 100.

The shipment management system 100 can obtain information from one or more sources such as, for example, suppliers 204 and/or carriers 206, which the shipment management system 100 can use to create shipments, provide shipment data, provide shipment tracking/visibility information, etc. Such information can include, for example and without limitation, information about a shipment (e.g., a load, a destination, an origin, shipment terms and/or requirements, invoices, booking data, rates, preferences, etc.), information about a load (e.g., load attributes such as the type of load, the weight of the load, load restrictions/constraints; delivery parameters; carrier; shipper; industry; shipment priority; appointment time; etc.), information about a carrier (e.g., carrier identity, carrier history, carrier statistics, carrier preferences, carrier profile, type of transportation vehicle, etc.), information about an industry (e.g., industry profile, industry preferences, industry statistics, industry requirements, industry constraints, etc.), information about a shipper (e.g., shipper identity, shipper history, shipper statistics, shipper preferences, shipper profile, etc.), historical information (e.g., shipping or carrier patterns or histories, load patterns or histories, industry patterns or histories, source and/or destination patterns or histories, router patterns or histories, etc.), mapping data, traffic data, weather data, news information, agency reports, order information, regulations, location information, tracking parameters, notifications, cost information, supply chain information, potential delays or hazards, trip information, sensor data (e.g., GPS data, electronic logging device (ELD) data, image sensor data, acceleration measurements, velocity measurements, elevation measurements, radar data, positioning data, etc.), status updates (e.g., location updates, delay updates, event updates, transportation updates, route/navigation updates, real-time updates, etc.), distance between an origin and destination location, booking data, and/or any other relevant information.

In some examples, the shipment management system 100 can receive at least some of such information from the suppliers 204 and/or the carriers 206 via the network 202 and/or a separate communication path such as a separate network, a direct connection (wired or wireless) connection, an out-of-band link/connection, and/or any other mechanism or path. In some examples, the shipment management system 100 can receive one or more portions of such information from the client devices 222-226 and/or the shipment data consumers 220. In some cases, the shipment management system 100 can obtain one or more portions of such information from one or more other sources (not shown). The one or more other sources can include, for example, the Internet, a news source, a government agency, a sensor or electronic device (e.g., a GPS device, an ELD device, a radar, a navigation system, etc.), a database, a data portal, a data repository, an email system, an API endpoint, a document management system, an ERP system, a TMS, a third party, a port, a vessel, a server, etc.

In some cases, the suppliers 204 and/or the carriers 206 can include one or more systems and/or components configured to communicate with the shipment management system 100 and/or integrate with (e.g., exchange and/or synchronize data) the shipment management system 100. For example, the suppliers 204 and/or the carriers 206 can include an ERP system configured to communicate with the shipment management system 100, a document management system configured to communicate with the shipment management system 100, an endpoint configured to communicate with the shipment management system 100, an API configured to communicate with the shipment management system 100, a server configured to communicate with the shipment management system 100, a data store (e.g., database, etc.) configured to communicate with the shipment management system 100, a transportation management system configured to communicate with the shipment management system 100, a booking system configured to communicate with the shipment management system 100, a collaboration system configured to communicate with the shipment management system 100, an email system, a file sharing system, etc.

While the example environment 200 is shown to include certain devices and entities, one of ordinary skill will appreciate that the example environment 200 is only one illustrative example and, in other examples, can include more or fewer devices and/or entities than those shown in FIG. 2.

Figure 3:
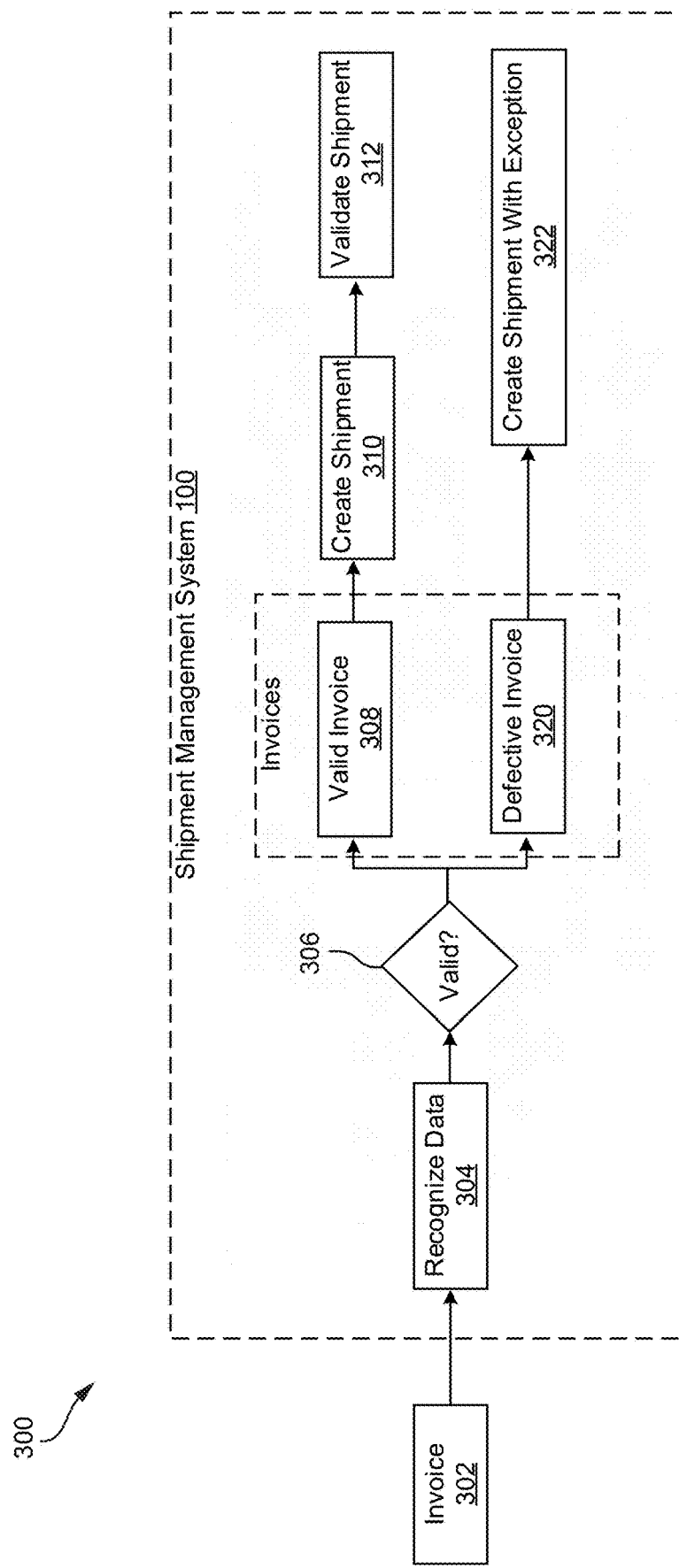
FIG. 3 is a diagram illustrating an example process for creating a shipment in a shipment management system based on data from an input document associated with a shipment booking, in accordance with some examples of the present disclosure.

FIG. 3 is a diagram illustrating an example process 300 for creating a shipment (e.g., shipment record and/or order) in the shipment management system 100 based on data from an input document (e.g., an invoice, a booking, a shipping notice, shipping instructions, a purchase order, a booking confirmation, a form, etc.) associated with a shipment booking. The shipment can request transportation of an item/load by land (e.g., road, yard, rail, etc.), water (e.g., ocean, river, etc.), air, within geographic boundaries (e.g., domestic/local/national), and/or across geographic boundaries (e.g., internationally, etc.).

In this example, at block 302, the shipment management system 100 can receive an invoice associated with a booking of a shipment. For explanation purposes, an invoice is used in this example and throughout the disclosure as a non-limiting illustrative example of an input document for creating a shipment. However, one of ordinary skill in the art will recognize that other input documents or combination of input documents (including or excluding an invoice) can also be used, such as for example, a purchase order, a booking confirmation, a shipping notice (e.g., an advanced shipping notice (ASN), etc.), a form or record created from a form, a booking, and/or any other document containing booking/shipping information.

In some examples, the shipment management system 100 can receive the invoice from a supplier associated with the booking. The invoice can include data about the shipment (e.g., shipment details) such as, for example and without limitation, a load, an origin location, a destination location, a rate or cost, shipment terms, and/or any other relevant information. In some examples, the invoice can be received in a particular format such as, for example, a PDF, an image file, or any other format.

In some cases, the sender of the invoice (e.g., the supplier, etc.) can send the invoice to an electronic address of the shipment management system 100, such as an email address, an IP address, etc. For example, the sender of the invoice can send the invoice to an email address associated with the shipment management system 100. In some examples, the sender can send the invoice as an attachment of an email to the shipment management system 100.

At block 304, the shipment management system 100 can recognize and extract data from the invoice. For example, in some cases, the shipment management system 100 can perform OCR to recognize data elements in the invoice and extract the data from the invoice. As another example, in some cases, the shipment management system 100 can implement a neural network that performs image processing on an image of the invoice to recognize and extract data in the image of the invoice.

At block 306, the shipment management system 100 can determine whether the invoice is valid (e.g., complete, accurate, without certain errors, readable, of a correct format, without viruses, etc.) based on the data extracted from the invoice. In some examples, the shipment management system 100 can analyze the extracted data and determine whether the data is missing any information needed to create and/or process a shipment, whether the data contains any inaccuracies, whether the data includes any conflicting information, whether the data violates or conflicts with any shipment and/or processing rules/requirements, whether the data represents the most current version of the invoice, whether the invoice can be read (e.g., due to file quality, format, type, etc.), whether the invoice contains a virus or malware, whether the invoice is not a supported file type, whether the data matches data from another instance of the shipment previously created, whether there are duplicate entries and/or files, whether certain data elements or fields are null or contain correct information, whether the invoice can be processed, and/or whether the data includes any other deficiencies.

In some examples, to determine whether the invoice is valid, the shipment management system 100 can compare the extracted data with data and/or data elements in one or more templates defining data requirements (e.g., required data, required data format(s), etc.). In some cases, to determine whether the invoice is valid, the shipment management system 100 can additionally or alternatively compare the extracted data with one or more terms, rules, checklists, configuration files, and/or requirements defined for invoices. For example, the shipment management system 100 can compare the extracted data with one or more terms, rules, configuration files, and/or requirements identified or predetermined for validating invoices. In some cases, to determine whether the invoice and/or associated data is valid, the shipment management system 100 can implement an AI/ML algorithm configured to analyze the invoice and/or associated data and determine if the invoice and/or associated data contains any of the foregoing deficiencies/errors.

If the shipment management system 100 is able to validate the extracted data, the shipment management system 100 can determine that the invoice is valid at block 308. On the other hand, if the shipment management system 100 is unable to validate the extracted data or determines that the extracted data includes one or more deficiencies that need correction (e.g., incomplete information, incorrect information, conflicting information, etc.), the shipment management system 100 can determine that the invoice is defective at block 320.

If the shipment management system 100 determines that the invoice is valid, at block 310, the shipment management system 100 can use the extracted data to create a shipment in the system. The shipment can include, for example and without limitation, shipping details (e.g., origin, destination, timing, carrier, schedule, routes, cost, constraints, load preferences, courier instructions, etc.), shipping terms, load details (e.g., type of load, number of items, load identifiers, load description, load weight, load size, load constraints, load attributes, etc.), a copy of the invoice, a copy of any other documents (e.g., customs documents, processing documents, bill of landing, packing list, purchase order, documentation, shipping documents, etc.), rates, shipping and/or processing workflow information, and/or any other relevant data.

At block 312, the shipment management system 100 can validate the shipment created based on the extracted data. In some examples, the shipment management system 100 can verify that the shipment includes all the information needed for the shipment, does not contain any errors, does not conflict with other data in the system, etc. In some cases, if any corrections are needed, the shipment management system 100 can implement such corrections and generate an updated shipment with the corrected information. In some cases, the shipment management system 100 can store the shipment with an indication of a validated status to indicate that the shipment can be used and/or is ready for use in document management, tracking, tracing, and/or other tasks.

If the shipment management system 100 determines that the invoice is defective at block 320, the shipment management system 100 can create a shipment with an exception at block 322. The shipment management system 100 can store the shipment with the exception in the system for further processing and/or use. The shipment with the exception can include an indication of an exception status that identifies the shipment as having an exception. In some examples, the shipment with the exception status can include information identifying the exception and/or any issues that triggered the exception, such as missing or incorrect information. In some examples, the shipment management system 100 can include exception information (e.g., exception status, exception details, etc.) in a header of the shipment or a field of the shipment. In some examples, the shipment management system 100 can include the exception information in metadata (e.g., a tag, a label, associated data, etc.) associated with or mapped to the shipment. In some cases, the shipment management system 100 can attempt to correct the shipment with the exception status or request additional information to update the shipment.

Figure 4:
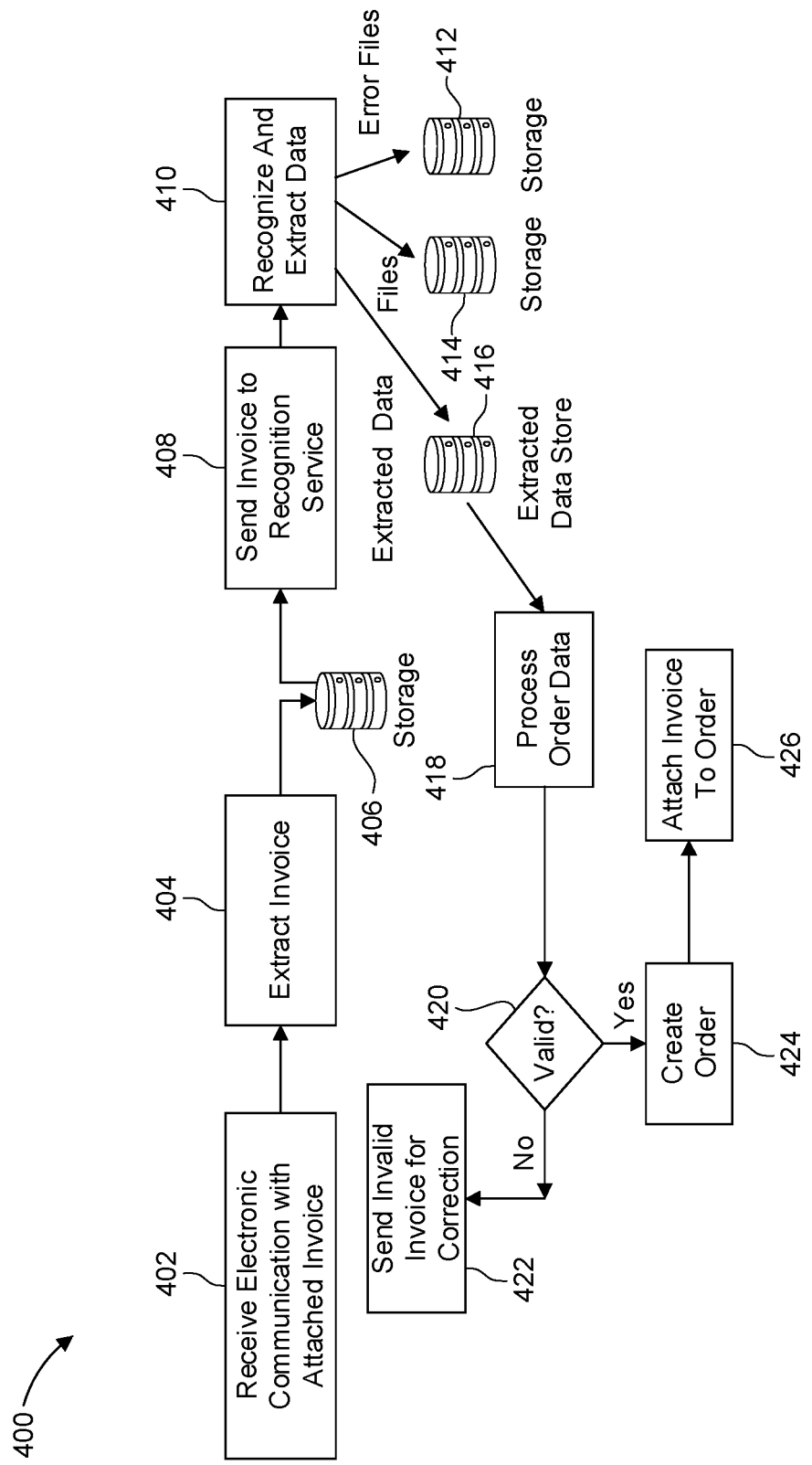
FIG. 4 is a diagram illustrating an example process for automating a shipment creation and validation, in accordance with some examples of the present disclosure.

FIG. 4 is a diagram illustrating an example process 400 for automating a shipment creation and validation. In this example, at block 402, the shipment management system 100 can receive an electronic communication with an attached invoice. The attached invoice can include an invoice generated by a relevant party, such as a supplier. In some examples, the electronic communication can include an email with the attached invoice sent to an address associated with the shipment management system 100. In other examples, the electronic communication can include any other type of communication such as, for example, a file transfer or upload, an API call, etc.

At block 404, the shipment management system 100 can extract the attached invoice from the electronic communication and store the invoice in a storage 406. In some examples, the shipment management system 100 can analyze the electronic communication to detect any attachments and extract any detected attachments, such as the invoice and any other attachments.

At block 408, the shipment management system 100 can send the invoice in the storage 406 to a recognition service. In some examples, the recognition service can include an application(s) and/or algorithm(s) configured to recognize data in the invoice and extract the data from the invoice. In some cases, the application and/or algorithm can include an OCR application. In some cases, the application and/or algorithm can include a neural network (e.g., a CNN, a classifier, etc.) configured to process invoices (e.g., PDF invoices, invoice images, invoices in any other format) and recognize and extract data in the processed invoices.

At block 410, the shipment management system 100 can recognize and extract (e.g., via the application and/or algorithm) the data from the invoice. The shipment management system 100 can store the extracted data in a data store 416 (e.g., a database, a table, a storage, a data structure, etc.) for use in processing the extracted data and creating a shipment as described herein. In some examples, if the invoice does not include any errors (or any errors that prevent further processing of the invoice or that need to be corrected), the shipment management system 100 can store the invoice in a storage 414. If the invoice includes any of such errors, the shipment management system 100 can store the invoice in a storage 412 for files containing errors.

At block 418, the shipment management system 100 can process order data based on the extracted data stored in the data store 416. In some examples, the shipment management system 100 can analyze the extracted data to determine whether the order data is valid/complete, whether the order data needs any corrections, what portions of the extracted data should be included in the order data and/or an associated order, format the order data, etc.

At block 420, the shipment management system 100 can determine whether the order data is valid. For example, the shipment management system 100 can determine whether the order data is complete (or sufficiently complete to create and/or process an order/shipment), whether the order data can be processed, whether the order conflicts with other data in the system, whether the order data contains any errors that render any portions of the order data invalid (e.g., inaccuracies, inconsistencies, conflicts, ambiguities, deficiencies, etc.), whether the order data includes certain data elements, etc.

At block 422, if the shipment management system 100 determines that the order data is invalid (or one or more portions of the order data are invalid), the shipment management system 100 can send the invoice associated with the order data for correction. In some cases, the shipment management system 100 can send (e.g., email, transmit, upload, share, etc.) the invoice to the party that created it for correction. In other cases, the shipment management system 100 can send the invoice to an application for analysis and correction. In other cases, the shipment management system 100 can send the invoice to one or more parties for manual processing to correct any invalidities.

At block 424, if the shipment management system 100 determines that the order data is valid, the shipment management system 100 can create an order (or shipment) based on the order data. The shipment management system 100 can store the created order for access by one or more parties (e.g., the shipper, the supplier, etc.) and/or systems, such as a tracking/visibility system of the shipment management system 100, a document management system of the shipment management system 100, a transportation management system of the shipment management system 100, an enterprise management system of the shipment management system 100, a database system of the shipment management system 100, a server, and/or any other system.

At block 426, the shipment management system 100 can attach the invoice to the order created by the shipment management system 100. The invoice can be associated with the order for future reference, record keeping, etc. In some examples, the shipment management system 100 can attach any other documents to the order such as, for example and without limitation, a documentation, carrier documents, supplier documents, and/or any other documents.

Figure 5:
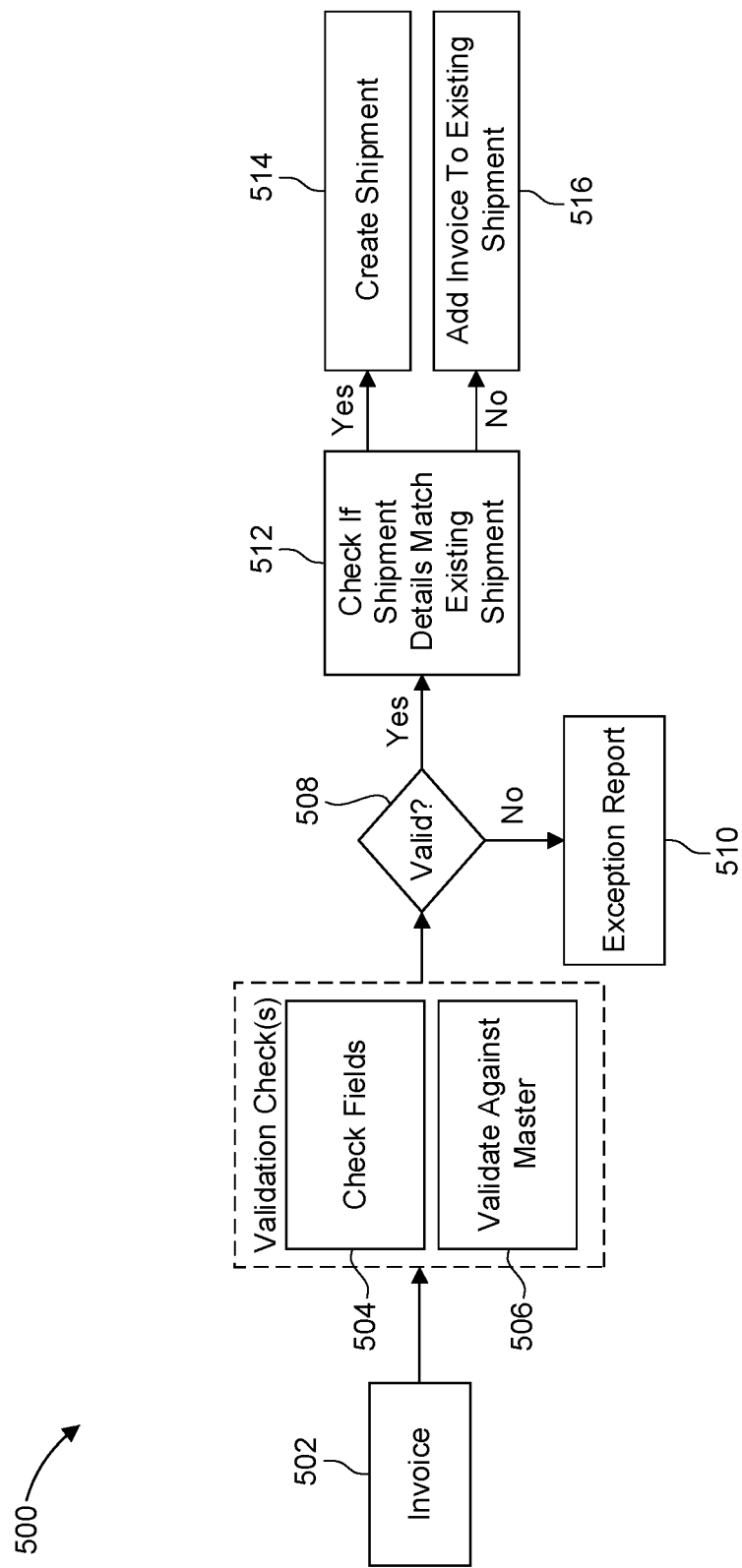
FIG. 5 is a diagram illustrating an example invoice processing flow, in accordance with some examples of the present disclosure.

FIG. 5 is a diagram illustrating an example invoice processing flow 500. In this example, at block 502, the shipment management system 100 can receive an invoice file and perform one or more validation checks on the invoice file. In some examples, at block 504, the shipment management system 100 can check/verify one or more fields in the invoice file to ensure that certain and/or required fields are included/populated in the invoice file and/or contain correct information. In some examples, the shipment management system 100 can verify that an origin field is properly populated with origin information, a destination field is properly populated with destination information, one or more shipping details fields are properly populated with the shipping details, etc. At block 506, the shipment management system 100 can validate the invoice file against a master, such as the invoice data in the system of the party that created the invoice, a product master document, etc.

In some examples, the shipment management system 100 can verify the invoice can be processed, verify the invoice does not contain a virus/malware, validate data types for all non-null fields (e.g., dates are dates, numbers are numbers, addresses are addresses, etc.) in the invoice file, validate bounded lists (e.g., carrier if entered is in a list of known carriers, etc.), validate any duplicate entries (e.g., detect a duplicate entry or record and mark a duplicate entry so the newer or more recent data is used to perform an update instead of an insert, etc.), validate any duplicate files (e.g., if the invoice has been processed before the version number of the document can be incremented and the data extracted can be used to update the existing shipment record(s), etc.), validate a completeness of the invoice file, etc. In some cases, when validating the invoice, the shipment management system 100 can verify that a shipment details field(s) is not null, a material code is not null and matches a product type value, a sold-to and/or a ship-to field matches corresponding data from a system of the supplier, a source country field matches corresponding data from a system of the supplier, and/or a product type field matches corresponding data from a system of the supplier.

In some examples, the shipment management system 100 can check that a shipping details field in the invoice contains a reference number that is a unique identifier (ID) for the shipment. In some cases, the shipment management system 100 can look for that reference ID in existing shipments. If there is a reference number, the shipment management system 100 can check if there is an existing order with the same reference number and, if so (e.g., if yes), the shipment management system 100 may not create a new order but can attach the invoice to the order with the same reference number. If there is no existing order with the same reference ID, the shipment management system 100 can create a new order, and add the reference ID in the shipment details field as the order reference ID.

At block 508, the shipment management system 100 can determine if the invoice is valid. The shipment management system 100 can determine if the invoice is valid based on the validation checks at block 504 and block 506. If the shipment management system 100 determines that the invoice is not valid, the shipment management system 100 at block 510 can generate an exception report. The exception report can indicate an exception status associated with the invoice. In some cases, the exception report can identify the reasons for the exception (e.g., the reason(s) why the invoice was determined to be invalid). In some cases, the exception report can be generated to set a status of the invoice to an exception status when the invoice fails the validation but the shipment can still be created despite the failed validation. In some cases, the shipment management system 100 can log any exceptions, create a list or view to manage the exceptions (e.g., with links to an order view where the exceptions can be corrected), and/or create a report of exceptions. In some cases, a report of exceptions can include groupings and/or counts by error.

At block 512, if the invoice is determined to be valid (e.g., passes the validation without an exception), the shipment management system 100 can check if the shipment details associated with the invoice match those of an existing shipment in the system. If the shipment details associated with the invoice match those of an existing shipment in the system, this can indicate that the invoice is not for a new order and rather for an order that has previously been processed. The shipment management system 100 can update the existing order based on the invoice and/or to include the invoice. If the shipment details associated with the invoice do not match those of any existing shipments in the system, this can indicate that the invoice is a new order and has not been previously processed.

At block 514, if the shipping details associated with the invoice do not match shipping details of any existing orders (e.g., any existing shipments), the shipment management system 100 can create a new shipment based on the data from the invoice. The shipment management system 100 can also attach the invoice to the new shipment associated with that invoice.

At block 516, if the shipping details associated with the invoice do match shipping details of an existing order (e.g., an existing shipment), the shipment management system 100 can add the invoice to the existing shipment associated with the matching shipping details. For example, the shipment management system 100 can update the existing shipment to include the invoice. In some cases, the shipment management system 100 can compare the data of the existing shipment with the data of the invoice and make any updates to the data of the existing shipment based on any data from the invoice determined to be newer than associated data in the existing shipment or determined to supplement or add to existing data in the existing shipment.

Figure 6:
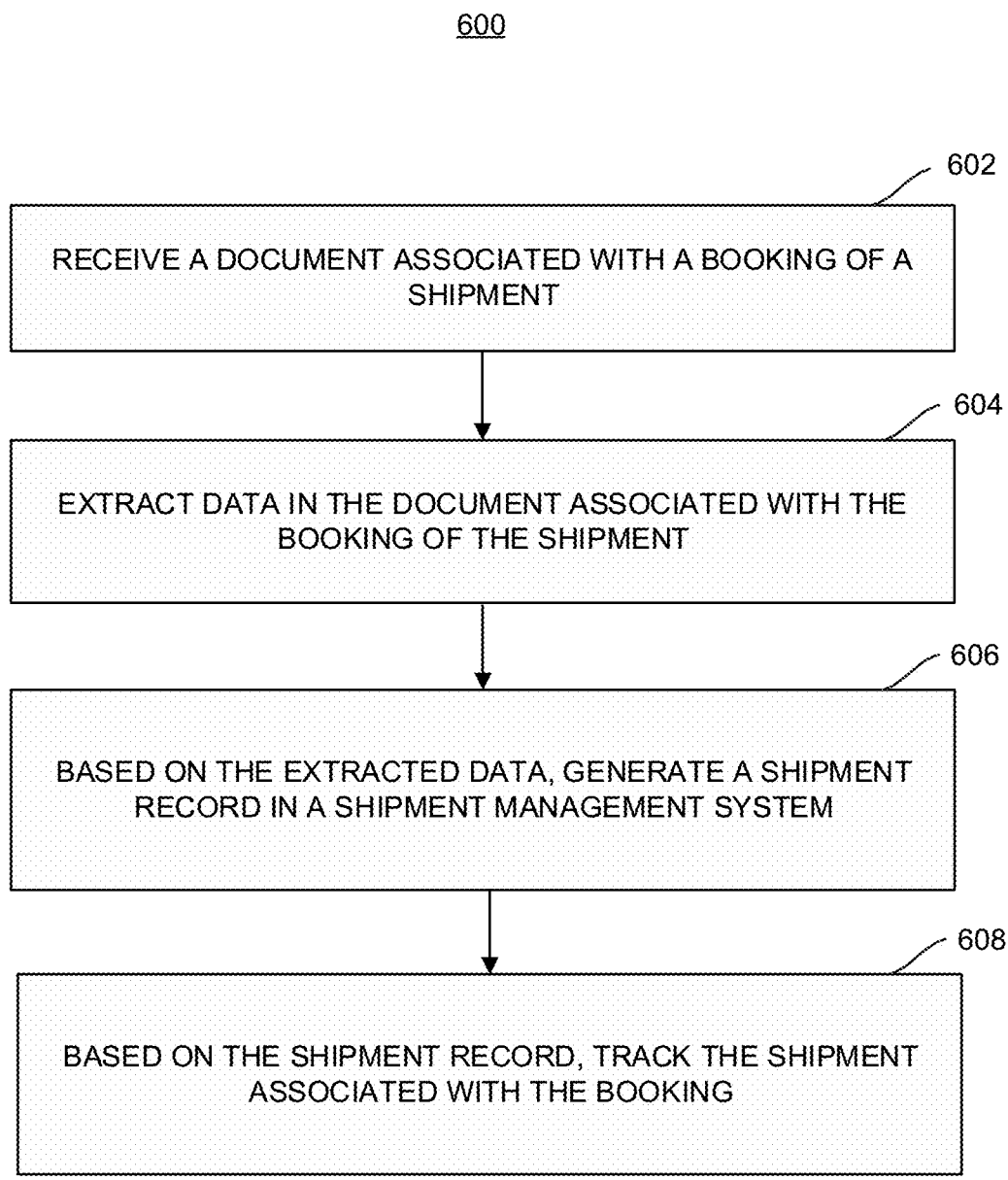
FIG. 6 is a flowchart illustrating an example method for supply chain management, tracking, and integration, in accordance with some examples of the present disclosure.

Having disclosed example systems and techniques, the disclosure now turns to the example method 600 shown in FIG. 6 for supply chain management, tracking, and integration. The steps and/or operations outlined herein are examples and can be implemented in any combination thereof, including combinations that exclude, add, or modify certain steps and/or operations.

At block 602, the method 600 can include receiving (e.g., via the shipment management system 100), a document associated with a booking of a shipment. In some examples, the document can be received via an email from a party (e.g., a supplier, a distributor, a carrier, etc.) that created the booking, a system (e.g., an ERP system, a TMS, a file transfer system, a document management system, etc.) of the party that created the booking, an API associated with the system of the party that created the booking, etc.

In some examples, the document can include an invoice, a purchase order, a booking confirmation, a demand record, a shipping instructions document, a booking/shipping form, and/or a shipping notice. In some cases, the document can include a PDF document. In some cases, the document can include an image file. In other cases, the document can include any other file format.

At block 604, the method 600 can include extracting (e.g., via the shipment management system 100), data in the document associated with the booking of the shipment. In some examples, the data is extracted via an optical character recognition algorithm, a neural network, an image processing algorithm, and/or a machine learning algorithm.

In some aspects, the method 600 can include recognizing data elements associated with the data, and generating the shipment record further based on the recognizing of the data. In some examples, the data elements can include a field, a topic, a label, and/or a semantic meaning. In some cases, recognizing the data elements can include recognizing, identifying, and/or classifying the field, the topic, the label, and/or the semantic meaning. In some cases, extracting the data in the document can include analyzing the document, extracting the data, and classifying at least some of the data.

At block 606, the method 600 can include generating, based on the extracted data, a shipment record in a shipment management system (e.g., shipment management system 100). The shipment record can include some or all of the information in the extracted data.

At block 608, the method 600 can include tracking, based on the shipment record, the shipment associated with the booking. In some cases, tracking the shipment associated with the booking can include providing, by the shipment management system to an interface associated with one or more devices (e.g., a supplier system, a carrier system, a mobile device, etc.), tracking data associated with the shipment. In some examples, the tracking data can include shipping details, order details, a rate, a status, an estimated time of arrival, an estimated time of departure, a shipment progress, a shipment route, a shipment trajectory, a shipment event, information about a load associated with the shipment, carrier information, a shipment record identifier, a message about the shipment from one or more parties, and/or any other shipment data.

In some aspects, the method 600 can include validating, prior to creating the shipment record, the document associated with the booking; and generating a validation status associated with the document. In some examples, the validation status can include an exception status, an in-progress status, and/or a valid status.

In some examples, validating the document can include validating data types of data in non-null fields, verifying that one or more required fields are not null, verifying that the document does not contain a virus, verifying a format of the document, verifying that the document can be processed by the shipment management system, verifying that the data in the document can be extracted via the one or more processors, verifying that the data in the document can be recognized via the one or more processors, and/or verifying that a carrier identified in the data matches an expected carrier and/or one of a set of known carriers.

In some cases, validating the document can include determining whether at least a portion of data in the document matches at least a portion of data in an existing shipment record. In some cases, if there is not a match, the method 600 can include determining that the document does not correspond to an existing shipment record. In some cases, if there is a match, the method 600 can include updating the existing shipment record. In some examples, generating the shipment record can include updating the existing shipment record based on a determination that the data in the document is more recent and/or accurate than data in the existing shipment record.

In some aspects, validating the document can include determining that an additional document received corresponds to the booking of the shipment and/or the shipment record; determining whether at least a portion of data in the additional document matches at least a portion of data in the shipment record; in response to determining that at least the portion of data in the additional document matches at least the portion of data in the shipment record, determining that at least the portion of data in the additional document is more recent than at least the portion of data in the shipment record; and updating the shipment record based on one or more portions of data in the additional document.

In some cases, validating the document can include receiving an additional document; and determining that data in the additional document does not match data in the shipping record.

In some cases, the validation status can include the exception status, and the method 600 can include generating the exception status in response to detecting an incorrect data type of data in a non-null field of the document, one or more required fields of the document are missing data, the document contains the virus, the format of the document does not match one or more predetermined formats, the document cannot be processed by the shipment management system, the data in the document cannot be extracted via the one or more processors, the data in the document cannot be recognized via the one or more processors, and/or the carrier identified in the data does not match the expected carrier and/or one of the set of known carriers.

Figure 7:
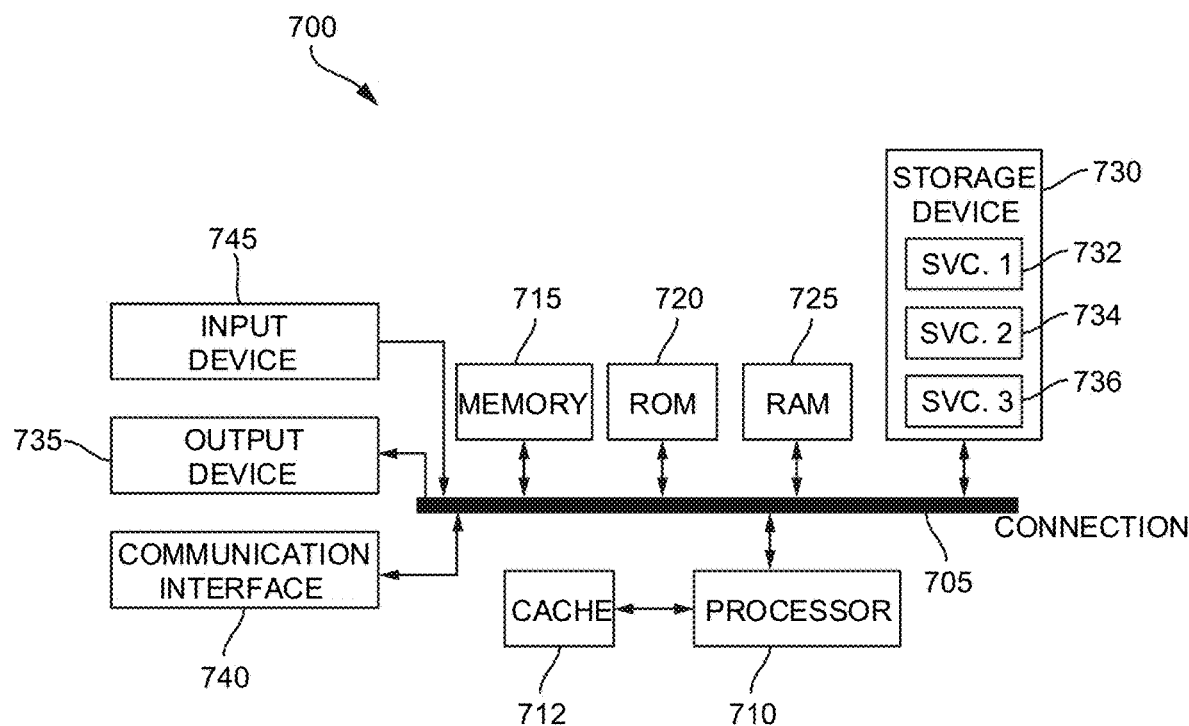
FIG. 7 illustrates an example computing device architecture, in accordance with some examples of the present disclosure.

FIG. 7 illustrates an example computing device architecture of an example computing device 700 which can implement the various techniques described herein. For example, the computing device 700 can implement the shipment management system 100 shown in FIG. 1 and perform the automated processes and/or supply chain tracking/visibility techniques described herein.

The components of the computing device 700 are shown in electrical communication with each other using a connection 705, such as a bus. The example computing device 700 includes a processing unit (CPU or processor) 710 and a computing device connection 705 that couples various computing device components including the computing device memory 715, such as read only memory (ROM) 720 and random access memory (RAM) 725, to the processor 710. The computing device 700 can include a cache of high-speed memory connected directly with, in close proximity to, or integrated as part of the processor 710. The computing device 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions.

Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software.

Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of" a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the Disclosure can Include

Aspect 1. A method comprising: receiving, via one or more processors, a document associated with a booking of a shipment; extracting, via the one or more processors, data in the document associated with the booking of the shipment, wherein the data is extracted via at least one of an optical character recognition algorithm, a neural network, an image processing algorithm, and a machine learning algorithm; based on the extracted data, generating a shipment record in a shipment management system; and based on the shipment record, tracking the shipment associated with the booking.

Aspect 2. The method of Aspect 1, further comprising: recognizing data elements associated with the data, the data elements comprising at least one of a field, a topic, a label, and a semantic meaning; and generating the shipment record further based on the recognizing of the data.

Aspect 3. The method of any of Aspects 1 to 2, wherein tracking the shipment associated with the booking comprises providing, by the shipment management system to an interface associated with one or more devices, tracking data associated with the shipment.

Aspect 4. The method of any of Aspects 1 to 3, wherein the document is received via at least one of an email from a party that created the booking, a system of the party that created the booking, and an application-programming interface associated with the system of the party that created the booking.

Aspect 5. The method of any of Aspects 1 to 4, further comprising: prior to creating the shipment record, validating the document associated with the booking; and generating a validation status associated with the document, the validation status comprising at least one of an exception status, an in-progress status, and a valid status.

Aspect 6. The method of Aspect 5, wherein validating the document comprises at least one of validating data types of data in non-null fields, verifying that one or more required fields are not null, verifying that the document does not contain a virus, verifying a format of the document, verifying that the document can be processed by the shipment management system, verifying that the data in the document can be extracted via the one or more processors, verifying that the data in the document can be recognized via the one or more processors, and verifying that a carrier identified in the data matches at least one of an expected carrier and one of a set of known carriers.

Aspect 7. The method of any of Aspects 5 to 6, wherein validating the document comprises determining whether at least a portion of data in the document matches at least a portion of data in an existing shipment record.

Aspect 8. The method of any of Aspects 5 to 7, wherein the validation status comprises the exception status, the method further comprising: generating the exception status in response to detecting at least one of an incorrect data type of data in a non-null field of the document, one or more required fields of the document are missing data, the document contains a virus, the format of the document does not match one or more predetermined formats, the document cannot be processed by the shipment management system, the data in the document cannot be extracted via the one or more processors, the data in the document cannot be recognized via the one or more processors, and a carrier identified in the data does not match at least one of an expected carrier and one of a set of known carriers.

Aspect 9. The method of any of Aspects 5 to 8, wherein validating the document comprises: determining that an additional document received corresponds to at least one of the shipment record and the booking of the shipment; determining whether at least a portion of data in the additional document matches at least a portion of data in the shipment record; in response to determining that at least the portion of data in the additional document matches at least the portion of data in the shipment record, determining that at least the portion of data in the additional document is more recent than at least the portion of data in the shipment record; and updating the shipment record based on one or more portions of data in the additional document.

Aspect 10. The method of Aspect 5, wherein validating the document comprises: receiving an additional document; and determining that data in the additional document does not match data in the shipment record.

Aspect 11. The method of any of Aspects 1 to 10, wherein the document comprises at least one of an invoice, a purchase order, a booking confirmation, a demand record, a shipping instructions document, and a shipping notice.

Aspect 12. A system comprising: one or more processors; and when executed by the one or more processors, cause the one or more processors to: receive a document associated with a booking of a shipment; extract data in the document associated with the booking of the shipment, wherein the data is extracted via at least one of an optical character recognition algorithm, a neural network, an image processing algorithm, and a machine learning algorithm; based on the extracted data, generate a shipment record in a shipment management system; and based on the shipment record, track the shipment associated with the booking.

Aspect 13. The system of Aspect 12, when executed by the one or more processors, cause the one or more processors to: recognize data elements associated with the data, the data elements comprising at least one of a field, a topic, a label, and a semantic meaning; classify at least one of the data elements and the data associated with the data elements; and based on the classifying of at least one of the data elements and the data associated with the data elements, generate the shipment record further.

Aspect 14. The system of any of Aspects 12 to 13, wherein tracking the shipment associated with the booking comprises providing, by the shipment management system to an interface associated with one or more devices, tracking data associated with the shipment.

Aspect 15. The system of any of Aspects 12 to 14, wherein the document is received via at least one of an email from a party that created the booking, a system of the party that created the booking, and an application-programming interface associated with the system of the party that created the booking, and wherein the document comprises at least one of an invoice, a purchase order, a booking confirmation, a demand record, a shipping instructions document, and a shipping notice.

Aspect 16. The system of any of Aspects 12 to 15, when executed by the one or more processors, cause the one or more processors to: prior to creating the shipment record, validate the document associated with the booking; and generate a validation status associated with the document, the validation status comprising at least one of an exception status, an in-progress status, and a valid status.

Aspect 17. The system of Aspect 16, wherein validating the document comprises at least one of validating data types of data in non-null fields, verifying that one or more required fields are not null, verifying that the document does not contain a virus, verifying a format of the document, verifying that the document can be processed by the shipment management system, verifying that the data in the document can be extracted via the one or more processors, verifying that the data in the document can be recognized via the one or more processors, and verifying that a carrier identified in the data matches at least one of an expected carrier and one of a set of known carriers.

Aspect 18. The system of any of Aspects 16 to 17, wherein the validation status comprises the exception status, when executed by the one or more processors, cause the one or more processors to: generate the exception status in response to detecting at least one of an incorrect data type of data in a non-null field of the document, one or more required fields of the document are missing data, the document contains a virus, the format of the document does not match one or more predetermined formats, the document cannot be processed by the shipment management system, the data in the document cannot be extracted via the one or more processors, the data in the document cannot be recognized via the one or more processors, and a carrier identified in the data does not match at least one of an expected carrier and one of a set of known carriers.

Aspect 19. The system of any of Aspects 16 to 18, wherein validating the document comprises: determining that an additional document received corresponds to at least one of the shipment record and the booking of the shipment; determining whether at least a portion of data in the additional document matches at least a portion of data in the shipment record; in response to determining that at least the portion of data in the additional document matches at least the portion of data in the shipment record, determining that at least the portion of data in the additional document is more recent than at least the portion of data in the shipment record; and updating the shipment record based on one or more portions of data in the additional document.

Aspect 20. The system of Aspect 16, wherein validating the document comprises: receiving an additional document; and determining that data in the additional document does not match data in the shipment record.

Aspect 21. The system of any of Aspects 12 to 20, wherein the document comprises at least one of an invoice, a purchase order, a booking confirmation, a demand record, a shipping instructions document, and a shipping notice.

Aspect 22. A non-transitory computer-readable storage medium comprising: instructions that, when executed by one or more processors, cause the one or more processors to: receive a document associated with a booking of a shipment; extract data in the document associated with the booking of the shipment; based on the extracted data, generate a shipment record in a shipment management system; and based on the shipment record, track the shipment associated with the booking.

Aspect 23. A system comprising means for performing a method according to any of Aspects 1 to 11.

Aspect 24. A non-transitory computer-readable storage medium comprising: instructions that, when executed by one or more processors, cause the one or more processors to perform a method according to any of Aspects 1 to 11.

What is claimed is:

1. A method comprising:
receiving, via one or more processors, a document associated with a booking of a shipment;
validating the document associated with the booking of the shipment, wherein validating the document comprises at least one of validating data types of data in non-null fields of the document, verifying that one or more required fields are not null in the document, and verifying that a carrier identified in the document matches at least one of an expected carrier and one of a set of known carriers;
extracting, via the one or more processors, data in the document associated with the booking of the shipment, wherein the data is extracted via at least one of an optical character recognition algorithm, a neural network, an image processing algorithm, and a machine learning algorithm;
based on the extracted data, generating a shipment record in a shipment management system; and
based on the shipment record, tracking the shipment associated with the booking.

2. The method of claim 1, further comprising:
recognizing data elements associated with the data, the data elements comprising at least one of a field, a topic, a label, and a semantic meaning; and
generating the shipment record further based on the recognizing of the data.

3. The method of claim 1, wherein tracking the shipment associated with the booking comprises providing, by the shipment management system to an interface associated with one or more devices, tracking data associated with the shipment.

4. The method of claim 1, wherein the document is received via at least one of an email from a party that created the booking, a system of the party that created the booking, and an application-programming interface associated with the system of the party that created the booking.

5. The method of claim 1, further comprising:
generating a validation status associated with the document, the validation status comprising at least one of an exception status, an in-progress status, and a valid status.

6. The method of claim 1, wherein validating the document further comprises at least one of verifying that the document does not contain a virus, verifying a format of the document, verifying that the document can be processed by the shipment management system, verifying that the data in the document can be extracted via the one or more processors, and verifying that the data in the document can be recognized via the one or more processors.

7. The method of claim 1, wherein validating the document comprises determining whether at least a portion of data in the document matches at least a portion of data in an existing shipment record.

8. The method of claim 1, further comprising:
generating an exception status associated with the document, the exception status being generated in response to detecting at least one of an incorrect data type of data in a non-null field of the document, one or more required fields of the document are missing data, the document contains a virus, a format of the document does not match one or more predetermined formats, the document cannot be processed by the shipment management system, the data in the document cannot be extracted via the one or more processors, the data in the document cannot be recognized via the one or more processors, and a carrier identified in the data does not match at least one of an expected carrier and one of a set of known carriers.

9. The method of claim 1, wherein validating the document comprises:
determining that an additional document received corresponds to at least one of the shipment record and the booking of the shipment;
determining whether at least a portion of data in the additional document matches at least a portion of data in the shipment record;
in response to determining that at least the portion of data in the additional document matches at least the portion of data in the shipment record, determining that at least the portion of data in the additional document is more recent than at least the portion of data in the shipment record; and
updating the shipment record based on one or more portions of data in the additional document.

10. The method of claim 1, wherein validating the document comprises:
receiving an additional document; and
determining that data in the additional document does not match data in the shipment record.

11. The method of claim 1, wherein the document comprises at least one of an invoice, a purchase order, a booking confirmation, a demand record, a shipping instructions document, and a shipping notice.

12. A system comprising:
one or more processors; and
at least one computer-readable storage medium having stored thereon instructions which, when executed by the one or more processors, cause the one or more processors to:
receive a document associated with a booking of a shipment;
validate the document associated with the booking of the shipment, wherein validating the document comprises at least one of validating data types of data in non-null fields of the document, verifying that one or more required fields are not null in the document, and verifying that a carrier identified in the document matches at least one of an expected carrier and one of a set of known carriers;
extract data in the document associated with the booking of the shipment, wherein the data is extracted via at least one of an optical character recognition algorithm, a neural network, an image processing algorithm, and a machine learning algorithm;
based on the extracted data, generate a shipment record in a shipment management system; and
based on the shipment record, track the shipment associated with the booking.

13. The system of claim 12, the at least one computer-readable storage medium having stored thereon instructions which, when executed by the one or more processors, cause the one or more processors to:
recognize data elements associated with the data, the data elements comprising at least one of a field, a topic, a label, and a semantic meaning;
classify at least one of the data elements and the data associated with the data elements; and
based on the classifying of at least one of the data elements and the data associated with the data elements, generate the shipment record further.

14. The system of claim 12, wherein tracking the shipment associated with the booking comprises providing, by the shipment management system to an interface associated with one or more devices, tracking data associated with the shipment.

15. The system of claim 12, wherein the document is received via at least one of an email from a party that created the booking, a system of the party that created the booking, and an application-programming interface associated with the system of the party that created the booking, and wherein the document comprises at least one of an invoice, a purchase order, a booking confirmation, a demand record, a shipping instructions document, and a shipping notice.

16. The system of claim 12, the at least one computer-readable storage medium having stored thereon instructions which, when executed by the one or more processors, cause the one or more processors to:
generate a validation status associated with the document, the validation status comprising at least one of an exception status, an in-progress status, and a valid status.

17. The system of claim 12, wherein validating the document further comprises at least one of verifying that the document does not contain a virus, verifying a format of the document, verifying that the document can be processed by the shipment management system, verifying that the data in the document can be extracted via the one or more processors, and verifying that the data in the document can be recognized via the one or more processors.

18. The system of claim 12, the at least one computer-readable storage medium having stored thereon instructions which, when executed by the one or more processors, cause the one or more processors to:
generate an exception status associated with the document, the exception status being generated in response to detecting at least one of an incorrect data type of data in a non-null field of the document, one or more required fields of the document are missing data, the document contains a virus, a format of the document does not match one or more predetermined formats, the document cannot be processed by the shipment management system, the data in the document cannot be extracted via the one or more processors, the data in the document cannot be recognized via the one or more processors, and a carrier identified in the data does not match at least one of an expected carrier and one of a set of known carriers.

19. The system of claim 12, wherein validating the document comprises:
determining that an additional document received corresponds to at least one of the shipment record and the booking of the shipment;
determining whether at least a portion of data in the additional document matches at least a portion of data in the shipment record;
in response to determining that at least the portion of data in the additional document matches at least the portion of data in the shipment record, determining that at least the portion of data in the additional document is more recent than at least the portion of data in the shipment record; and
updating the shipment record based on one or more portions of data in the additional document.

20. A non-transitory computer-readable storage medium comprising:
instructions that, when executed by one or more processors, cause the one or more processors to:
receive a document associated with a booking of a shipment;
validate the document associated with the booking of the shipment, wherein validating the document comprises at least one of validating data types of data in non-null fields of the document, verifying that one or more required fields are not null in the document, and verifying that a carrier identified in the document matches at least one of an expected carrier and one of a set of known carriers;
extract data in the document associated with the booking of the shipment;
based on the extracted data, generate a shipment record in a shipment management system; and
based on the shipment record, track the shipment associated with the booking.

* * * * *